(12) United States Patent
Marwah et al.

(10) Patent No.: US 10,025,820 B2
(45) Date of Patent: *Jul. 17, 2018

(54) QUERY AND EXADATA SUPPORT FOR HYBRID COLUMNAR COMPRESSED DATA

(71) Applicant: Oracle International Corporation, Redwood Shores, CA (US)

(72) Inventors: Vineet Marwah, San Ramon, CA (US); Vikram Kapoor, Cupertino, CA (US); Jesse Kamp, Castro Valley, CA (US); Kam Shergill, Maidenhead (GB); Roger MacNicol, Hummelstown, PA (US); Sachin Kulkarni, Sunnyvale, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,009

(22) Filed: Sep. 8, 2014

(65) Prior Publication Data

US 2015/0032763 A1   Jan. 29, 2015

Related U.S. Application Data

(63) Continuation of application No. 12/871,824, filed on Aug. 30, 2010, now Pat. No. 8,832,142.

(51) Int. Cl.
*G06F 17/30* (2006.01)
(52) U.S. Cl.
CPC .. *G06F 17/30442* (2013.01); *G06F 17/30477* (2013.01); *G06F 17/30522* (2013.01)

(58) Field of Classification Search
CPC ......... G06F 17/30153; G06F 17/30315; G06F 17/30501
See application file for complete search history.

(56) References Cited

U.S. PATENT DOCUMENTS

| | | |
|---|---|---|
| 5,255,356 A | 10/1993 | Michelman et al. |
| 5,265,246 A | 11/1993 | Li |
| 5,404,510 A | 4/1995 | Smith et al. |
| 5,794,228 A | 8/1998 | French |
| 5,794,229 A | 8/1998 | French et al. |

(Continued)

OTHER PUBLICATIONS

U.S. Appl. No. 13/371,354, filed Feb. 10, 2012, Office Action, Sep. 28, 2012.

(Continued)

*Primary Examiner* — Alexander Khong
(74) *Attorney, Agent, or Firm* — Hickman Palermo Becker Bingham LLP (57) ABSTRACT

A method and apparatus is provided for optimizing queries received by a database system that relies on an intelligent data storage server to manage storage for the database system. Storing compression units in hybrid columnar format, the storage manager evaluates simple predicates and only returns data blocks containing rows that satisfy those predicates. The returned data blocks are not necessarily stored persistently on disk. That is, the storage manager is not limited to returning disc block images. The hybrid columnar format enables optimizations that provide better performance when processing typical database workloads including both fetching rows by identifier and performing table scans.

24 Claims, 5 Drawing Sheets

(56) References Cited

U.S. PATENT DOCUMENTS

| | | | |
|---|---|---|---|
| 6,061,763 | A | 5/2000 | Rubin et al. |
| 6,216,125 | B1 | 4/2001 | Johnson |
| 6,334,123 | B1* | 12/2001 | Ross ............... G06F 17/30324 |
| 6,959,300 | B1 | 10/2005 | Caldwell et al. |
| 6,973,452 | B2 | 12/2005 | Metzger |
| 7,031,994 | B2 | 4/2006 | Lao et al. |
| 7,272,589 | B1 | 9/2007 | Guay |
| 7,496,589 | B1 | 2/2009 | Jain et al. |
| 7,552,130 | B2 | 6/2009 | Cook et al. |
| 7,558,290 | B1 | 7/2009 | Nucci et al. |
| 7,590,641 | B1 | 9/2009 | Olson |
| 7,720,878 | B2 | 5/2010 | Caldwell et al. |
| 8,032,499 | B2 | 10/2011 | Faerber et al. |
| 8,060,476 | B1 | 11/2011 | Afonso |
| 8,203,972 | B2 | 6/2012 | Sauermann |
| 8,392,382 | B2 | 3/2013 | Marwah et al. |
| 8,583,692 | B2 | 11/2013 | Ganesh et al. |
| 8,645,337 | B2 | 2/2014 | Kapoor et al. |
| 8,700,579 | B2 | 4/2014 | Apanowicz |
| 8,832,142 | B2 | 9/2014 | Marwah et al. |
| 2003/0028509 | A1 | 2/2003 | Sah |
| 2003/0212694 | A1 | 11/2003 | Potapov et al. |
| 2004/0033803 | A1 | 2/2004 | Varonen et al. |
| 2004/0034616 | A1 | 2/2004 | Witkowski |
| 2004/0117396 | A1 | 6/2004 | Avadhanam et al. |
| 2005/0086267 | A1 | 4/2005 | Avadhanam et al. |
| 2005/0192941 | A1* | 9/2005 | Biedenstein ...... G06F 17/30489 |
| 2005/0210054 | A1 | 9/2005 | Harris |
| 2006/0074941 | A1* | 4/2006 | Flynn ................... G06F 3/0605 |
| 2006/0190425 | A1* | 8/2006 | Chang ............... G06F 17/30256 |
| 2007/0033354 | A1 | 2/2007 | Burrows |
| 2007/0061544 | A1 | 3/2007 | Uppala |
| 2007/0109155 | A1 | 5/2007 | Fallon |
| 2007/0112736 | A1* | 5/2007 | Okamoto ............ G06F 17/3046 |
| 2007/0143248 | A1 | 6/2007 | Uppala |
| 2008/0050025 | A1 | 2/2008 | Bashyam et al. |
| 2008/0071818 | A1 | 3/2008 | Apanowicz et al. |
| 2008/0162521 | A1 | 7/2008 | Browning |
| 2008/0162523 | A1 | 7/2008 | Kraus et al. |
| 2008/0294676 | A1 | 11/2008 | Faerber et al. |
| 2008/0294863 | A1* | 11/2008 | Faerber et al. ............... 711/170 |
| 2009/0019029 | A1* | 1/2009 | Tommaney ....... G06F 17/30471 |
| 2009/0254516 | A1 | 10/2009 | Meiyyappan |
| 2010/0030796 | A1* | 2/2010 | Netz ................ G06F 17/30501 707/756 |
| 2010/0088315 | A1 | 4/2010 | Netz |
| 2010/0161567 | A1 | 6/2010 | Makela |
| 2010/0278446 | A1 | 11/2010 | Ganesh et al. |
| 2010/0281004 | A1 | 11/2010 | Kapoor et al. |
| 2010/0281079 | A1 | 11/2010 | Marwah et al. |
| 2011/0040771 | A1 | 2/2011 | Gilyadov |
| 2011/0219020 | A1* | 9/2011 | Oks et al. ...................... 707/769 |
| 2012/0117038 | A1 | 5/2012 | Ganesh et al. |
| 2012/0143833 | A1 | 6/2012 | Ganesh et al. |
| 2013/0036101 | A1 | 2/2013 | Marwah et al. |
| 2015/0149479 | A1 | 5/2015 | Geringer et al. |
| 2015/0381647 | A1 | 12/2015 | Huang |

OTHER PUBLICATIONS

U.S. Appl. No. 12/871,824, filed Aug. 30, 2010, Notice of Allowance, Jan. 23, 2014.
U.S. Appl. No. 12/871,824, filed Aug. 30, 2010, Office Action, Jun. 26, 2012.
U.S. Appl. No. 12/871,824, filed Aug. 30, 2010, Notice of Allowance, Apr. 30, 2014.
U.S. Appl. No. 12/871,824, filed Aug. 30, 2010, Final Office Action, Jan. 4, 2013.
U.S. Appl. No. 12/769,205, filed Apr. 28, 2010, Notice of Allowance, Jul. 29, 2013.
U.S. Appl. No. 12/617,669, filed Nov. 12, 2009, Notice of Allowance, Jul. 16, 2014.
U.S. Appl. No. 12/617,669, filed Nov. 12, 2009, Notice of Allowance, Mar. 13, 2014.
U.S. Appl. No. 12/617,669, filed Nov. 12, 2009, Final Office Action, Sep. 25, 2012.
U.S. Appl. No. 12/617,669, filed Nov. 12, 2009, Office Action, Sep. 19, 2013.
Winter Corporation, Demonstrating Efficiency in Large-Scale Data Warehousing, A review of new TPC-H results for the Sun-Sybase IQ Platform, 20 pages, dated in 2003.
Sybase IQ, Gaining the Performance Edge Using a Column-Oriented Database Management System, 12 pages, dated Mar. 2009.
Sybase IQ, An Advanced Columnar Data Warehouse Architecture, Winter Corporation, 17 pages, Dated Jun. 2010.
Sybase IQ, Administration Guide, Document ID: 35375-01-1121-02, dated Sep. 19, 1997, 426 pages.
Rabb, David,How to Judge a Columnar Database, Information Management, website http://license.icopyright.net/user/viewFreeUse.act?fuid=MTMxMDAzMjU%3D, dated Dec. 14, 2007, 2 pages.
Macnicol, Roger et. al., Sybase IQ Multiplex—Designed for Analytics,Proceeding VLDB 2004, vol. 30, 2004, VLDB Endowment, ISBN:0-12-088469-0, 4 pages.
Macnicol Roger et al, Sybase IQ Multiplex-Designed for Analytics, Proceedings of the 30th VLDB Conference, dated 2004, 4 pages.
Abadi, Daniel J. et. al., Column-Stores vs. Row-Stores: How Different Are They Really?, ACM 2008, SIGMOD, Jun. 9th Jun. 12, 2008, 14 pages.
U.S. Appl. No. 13/631,575, filed Sep. 28, 2012, Office Action, Jul. 20, 2015.
U.S. Appl. No. 14/092,503, filed Nov. 27, 2013, Office Action, Aug. 4, 2015.
U.S. Appl. No. 14/092,503, filed Nov. 27, 2013, Final Office Action, Jan. 14, 2016.
U.S. Appl. No. 13/631,575, filed Sep. 28, 2012, Final Office Action, Jan. 12, 2016.
Ailamaki, Anastassia, et al, "Weaving Relations for Cache Performance," Proceedings of the 27th International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).
U.S. Appl. No. 12/871,824, filed Aug. 30, 2010.
Kapoor, U.S. Appl. No. 14/079,507, filed Nov. 13, 2013, Office Action, dated Dec. 14, 2016.
The United States Patent Trademark Office, *Realtime Data LLC* v. *Oracle International Corporation*, "Decision" dated Sep. 13, 2016, 29 pages.
Kapoor, U.S. Appl. No. 14/079,507, filed Nov. 13, 2013, Interview Summary, dated Mar. 17, 2017.
G. F. Coulouris, et al., "Towards content-addressing in data bases", Department of Computer Science and Statistics, Queen Mary College, dated Aug. 1971, pp. 95-98, vol. 15, No. 2.
Erik Riedel, et al., "Active Disks—Remote Execution for Network-Attached Storage" dated Dec. 1997, 13 pages.
Enticknap, et al., "Resurrection" the Bulletin of the Computer Conservation Society, The British Computer Society and the Science Museum of London, dated Summer 1995, 39 pages, Issue No. 12.
C. H. C. Leung, et al., "File Processing Efficiency on the Centent Addressable File Store", Department of Computer Science University College London, pp. 282-291, section 2.

\* cited by examiner

Return Block 420

|    | c1 | c2 | c3 |
|----|----|----|----|
| r1 | Al | Bob | Cat |
| r2 | 24 | 21 | 29 |
| r3 | San Jose | San Jose | Oakland |
| r4 | T | F | T |
| r5 | F | F | T |

Cache-friendly matrix column-major format 430

| (r1,c1), 2 | (r1,c2), 3 |
|---|---|
| (r2,c1), 2 | (r2,c2,) 2 |
| (r3, c1), 8 | (r3, c2), 8 |
| (r4, c1), 1 | (r4, c2), 1 |
| (r5, c1), 1 | (r5, c2), 1 |

| (r1,c1), 2 | (r2,c1), 2 | (r3, c1), 8 | (r4, c1), 1 | (r5, c1), 1 |
|---|---|---|---|---|
| (r1,c2), 3 | (r2,c2,) 2 | (r3, c2), 8 | (r4, c2), 1 | (r5, c2), 1 |

Cache-friendly matrix in row-major format 440

QUERY AND EXADATA SUPPORT FOR HYBRID COLUMNAR COMPRESSED DATA

CROSS-REFERENCE TO RELATED APPLICATIONS

This application claims priority, as a continuation application, to application Ser. No. 12/871,824, filed Aug. 30, 2010, the entire contents of which are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 12/769,205, filed Apr. 28, 2010 entitled "Storing Compression Units in Relational Tables" by Kapoor et al., the entire contents of which is hereby incorporated by reference as if fully set forth herein.

This application is related to U.S. Provisional Patent Application No. 61/174,447, filed Apr. 30, 2009 entitled "Superblocks," by Ganesh et al., the entire contents of which is hereby incorporated by reference as if fully set forth herein.

This application is related to U.S. patent application Ser. No. 12/617,669, filed Nov. 12, 2009 entitled "Structure Of Hierarchical Compressed Data Structure For Tabular Data," by Ganesh et al., the entire contents of which is hereby incorporated by reference as if fully set forth herein.

This application is related to U.S. patent application Ser. No. 12/769,508, filed on Apr. 28, 2010 entitled "Compression Analyzer," by Marwah et al, the entire contents of which is hereby incorporated by reference as if fully set forth herein.

FIELD OF THE INVENTION

The present invention relates to optimizing database queries performed on compressed data.

BACKGROUND

Databases and Database Servers

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Database metadata defines database objects, such as tables, object tables, views, or complex types, such as object types, and, importantly table functions. SQL data definition language ("DDL") instructions are issued to a database server to create or configure database objects.

Generally, data is logically arranged within a database as one or more data containers. Each container contains records, and the data within each record is organized into one or more fields. In relational database systems, the data containers are typically referred to as tables, the records are referred to as rows, and the fields are referred to as columns.

Data Ordering within Data Blocks

While databases are arranged logically in data containers, those containers are themselves typically stored in one or more data blocks on, for example, a hard disk. So, for example, while most users will issue instructions or queries to the database server which refer to data via reference to tables, rows, and columns, that data is actually stored in a database as a collection of data blocks. Through the use of various stored metadata, indexes, and headers, the database server is able to interpret the data within these data blocks as logical tables, rows, and columns.

A data block is an atomic unit of storage space allocated to store raw data for one or more database records (e.g., rows), or portions thereof. Typically, a database system is configured to read and write database records from persistent storage and volatile memory in units no smaller than data blocks. When a record from a data block needs to be retrieved, the entire data block is read into an in-memory buffer the database system uses to temporarily store data blocks. In many databases, data blocks are all of a common size. Database administrators select this size based on a number of considerations. However, tables often comprise more data than can fit in a single data block. Thus, tables often span many data blocks.

Logically, tabular data resides in a table-like structure, such as a spreadsheet or relational table, which may comprise an ordered arrangement of rows and columns. However, the actual physical storage of the tabular data may take a variety of forms. For example, although the logical structure of the tabular data may be multidimensional, the tabular data may physically be stored in linear format, such as in row-major or column major format.

Figure 1:
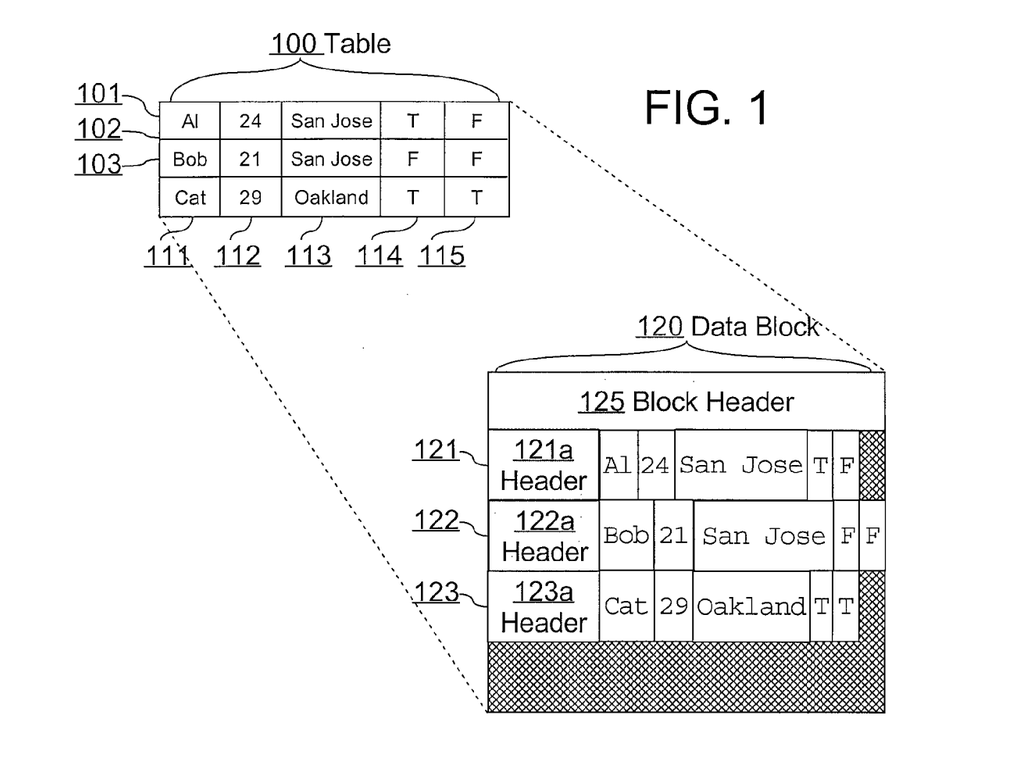
FIG. 1 illustrates a data block organized in row-major order, according to an embodiment of the invention.

In row-major format, column values of a row from the table-like structure are stored contiguously in persistent storage. For example, if a table has n rows and m columns, and i represents a particular row number and j represents a particular column number, then data items represented as (i, j) would be stored in row major format as: (1,1) (1, 2) (1,3) . . . (1,m), (2,1), (2,2), (2,3), . . . (2, m) . . . (n, 1), (n,2), (n,3) . . . (n,m). Systems that store data in row-major format are very efficient at finding and retrieving specific rows. However, evaluating a predicate requires reading all rows to obtain the column value of the column referenced in the predicate. Thus, table scans are time consuming when performed on data stored in row-major format. FIG. 1 illustrates a data block organized in a format known as row major order.

Other databases may instead store tables within data blocks using other formats, including formats such as "column major." In column major format, for a given column of multiple rows, column values of the column are stored contiguously. For the example above of a table with n rows and m columns, the data items would be stored in column major order as (1,1), (2,1), (3,1) . . . (n,1), (1,2), (2,2), (3,2) . . . (n,2) . . . (1,m), (2, m), (3,m) . . . (n,m). Evaluating predicates on data stored in column-major format can be very efficient because a column may be read in isolation from other columns and tables can be scanned quickly. However, retrieving a particular row requires reading all columns to find values for a particular row. Thus, retrieving a particular row may be slow when performed by a system that stores data in column-major format, because values have to be read from non-contiguous storage. Neither row-major nor column-major format performs well when processing a typical database workload that includes both fetching particular rows and performing table scans.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A relational database management system (RDBMS) may store data in compressed format to reduce the amount of persistent storage media required to contain the database, as well as to reduce the amount of data transmitted over a network. However, performing queries on data stored in compressed format is problematic. Uncompressing data before it can be used to evaluate a query slows down query evaluation. Thus, ways of minimizing the amount of data that must be decompressed to evaluate a query are needed.

The approach herein relies on relatively small units of compression, called compression units (CU). Compression units hold data from a small subset of a database table. A compression unit may hold, for example, only 1000 rows. A compression unit's size is selected so that the entire CU may reside within available cache. The size of a compression unit depends on how much space each row takes. Thus, for a very large row size, a compression unit may only store a few rows and for a very small row size, a compression unit may store tens of thousands of rows.

A compression unit stores data for a set of rows; however, within the compression unit, the rows may be stored in column-major format. In an embodiment, a CU may contain other compression units, referred to as child compression units. Within the compression unit, one or more child compression units contiguously store column values of a single column. This format is referred to as hybrid columnar format because one "parent" compression unit holds the entirety of a set of rows; however, within the parent compression unit, the rows are stored in column major format. The hybrid format allows for reasonable performance when retrieving a particular row and when performing table scans, which provides benefits over approaches that use only row-major or only column-major format.

Metadata stored within the CU indicates where one column ends and the next begins. Furthermore, value range data is stored within the CU for each column. The combination of the small CU size and per-CU metadata may be exploited for performance enhancements, as described below.

Database table data stored in CU's may be stored on disk under control of the RDBMS directly or in a storage management server. One such storage management server is an Exadata server. An Exadata server is a storage server that is constructed to work cooperatively with a RDBMS. Whereas ordinary storage management servers simply provide blocks of persistently stored data as requested by an RDBMS, an Exadata server can perform some filtering that is offloaded by the RDBMS. Furthermore, the blocks of data returned to the RDBMS from an Exadata server that has performed filtering may be comprised of rows of data that are stored in different persistently stored data blocks. That is, rows of data returned to the RDBMS in the same data block need not be stored persistently in the same data block. In addition, a return data block may be comprised of rows stored persistently in different compression units.

Obtaining the benefits realized by storing table data in compression units requires overcoming challenges when the CU are stored and manipulated by the Exadata server. The Exadata server may be enhanced to fully exploit the benefits of storing, retrieving, decompressing, and filtering CU's. Performing query optimization requires more intelligence as the cost of decompressing and other costs associated with function shipping to the storage server must be assessed and evaluated along with the relative selectivity of each predicate. In addition, the interface between the Exadata server and the RDBMS may be enhanced as well.

The description of managing compression units in hybrid columnar format is described herein as performed by the Exadata server. Although a database server may directly manage storage for compressed CU's stored in hybrid-columnar form and perform all the operations that an Exadata server can perform, performance gains are achieved by delegating most of the storage-related and simply filtering operations to be performed by the Exadata server.

Compression Units

According to an embodiment, data from certain table rows (or an entire table) in a database may be compressed into compression units. For example, a database comprising multiple data blocks may be compressed entirely into a single compression unit using any of a variety of techniques. Example techniques for compressing tabular data into a compression unit are discussed, for instance, in U.S. patent application Ser. No. 12/617,669 by Ganesh et al., entitled "STRUCTURE OF HIERARCHICAL COMPRESSED DATA STRUCTURE FOR TABULAR DATA" and filed Nov. 12, 2009, and in U.S. patent application Ser. No. 12/769,508 by Kapoor, et al., entitled "COMPRESSION ANALYZER" and filed Apr. 28, 2010. However, embodiments of the invention are not limited to the techniques described in "STRUCTURE OF HIERARCHICAL COM- PRESSED DATA STRUCTURE FOR TABULAR DATA" or "COMPRESSION ANALYZER."

For convenience, this application may refer to certain compression units as compressed data for certain tables. By such language, this application does not limit its techniques to compression units comprising an entire table; rather a compression unit may simply comprise data from at least a portion of the table. Likewise, this application may, for convenience, describe certain compression units as comprising compressed data for one or more table rows or one or more of table columns. By such language, this application does not require that the compression units include each and every value in each of the one or more table rows or in each of the one or more table columns. Rather, a compression unit that includes compressed data for one or more table rows or one or more of table columns may simply include compressed data from at least a portion of each table row or table column in the one or more table rows or the one or more table columns.

Compressing a compression unit does not involve compressing and storing each individual value in the compression unit. Once data is stored in a compression unit in hybrid-columnar format, the data may first be transformed. An example transformation is that the data may be run-length encoded. Run-length encoding removes duplicate consecutive entries by including the actual value once and the number of times that value appears consecutively. For example, three consecutive rows have the value "CA" in a column representing state, then the transformed data may be represented as "3 CA". Storing column data contiguously allows for better compression, because repeated values are more likely within a column than within the same row and across columns. Other transformations include bitvector and dictionary encoding. Dictionary encoding is a method of data compression in which each data item is replaced by a number which is the position of that data item in a dictionary. As transformation is a kind of compression, it may be referred to herein as a first level of compression or a second level of decompression.

After transforming the data, it may be compressed. To fully decompress a compression unit to retrieve the originally stored table data requires first transforming the data as described above and then decompressing the entire compression unit. Examples of compression algorithms include Lempel-Ziv-Oberhumer (LZO), DEFLATE (ZLIB), BZ2 (bzip2). Using these kinds of algorithms may be referred to herein as a second level of compression or a first level of decompression.

A Compression Unit Spanning Multiple Data Blocks

Depending on the size of a compression unit and the size of the data blocks available to store the compression unit, it may be necessary to divide a compression unit into separate portions that may be stored over multiple data blocks. This division of the compression unit into one or more compression unit portions occurs subsequent to generating the compression unit, and is therefore conceptually separate from the previously discussed division of a table into one or more table portions (although data block size may nonetheless be a consideration in determining how divide a table into portions for compression).

A variety of techniques may be used to divide a compression unit into portions. The compression unit may be divided, for example, so that all portions of the compression unit (or all but the last portion) are of a desired size, the desired size being less than or equal to the size of data blocks in the database. As another example, the compression unit may be divided based on characteristics of the compressed data inside of the compression unit—so that, for example, the compressed data for certain columns or rows is contained entirely within a portion or group of portions. As with uncompressed table rows that span multiple data block rows, a compression unit may be described as being chained across multiple data blocks.

Figure 2:
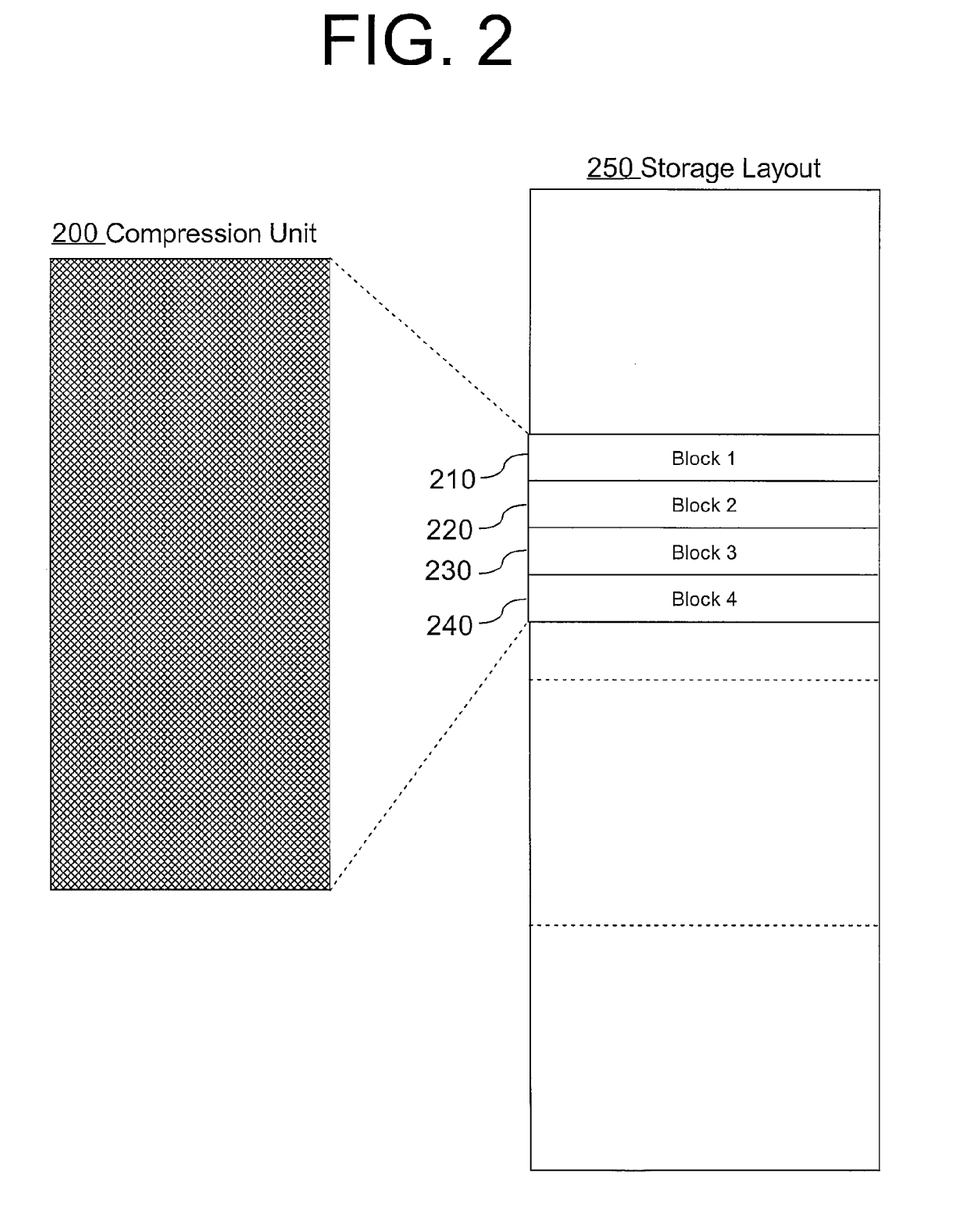
FIG. 2 is a block diagram that illustrates that a compression unit may be stored in contiguous data blocks, according to an embodiment of the invention.

In an embodiment, compression unit portions are stored in data blocks that are co-located in a contiguous segment of memory or storage. Thus, the storage management server may retrieve the compression unit (or a contiguous set of compression unit portions) from the memory or storage in a single input/output (I/O) operation. For example, in FIG. 2 data blocks 210, 220, 230, and 240 may be contiguous data blocks within Storage Layout 250. To read these data blocks from disk, the storage management server need only issue a single I/O request for the range of data blocks starting with data block 210 and ending with the end of data block 240. The compression of table data afforded by compression units, coupled with this co-location of data for compression unit portions in a contiguous range of data blocks, allows the storage management server to quickly read data for a table or significant portion thereof with a minimal number of I/O operations.

In an embodiment, the storage management server may utilize the co-location of compression unit portions in contiguous data blocks to perform pre-fetching. When the storage management requires a data block comprising one portion of a compression unit, the storage management may, in the same I/O operation, also fetch other contiguous data blocks that comprise other compression unit portions for the same compression unit, even though those compression unit portions may not yet be required. In this manner, the database server may preemptively cache other compression unit portions that are likely to be required in the same time frame as the first compression unit portion, thereby avoiding the need for performing subsequent I/O operations to fetch the other compression unit portions should those portions be required at a later time.

Accessing Compressed Data without Decompressing the Entire Compression Unit

According to an embodiment, a database server may utilize compression units more efficiently by avoiding decompression of compression unit portions that do not comprise data to which the database server requires access. Further benefits arise out of such behavior when each compression unit portion is stored in a different data block, thereby avoiding the need for the storage management to read from disk those data blocks containing the portions that do not require decompression.

To facilitate this behavior, the database server may store metadata for a compression unit identifying locations at which the compressed data for certain columns or rows is held. Based on this information, whenever the database server receives a request that only asks for data from the certain rows or certain columns, the database server may determine exactly which set of portions must be decompressed, or at least one or more portions that do not comprise the data from the certain rows or columns. The database server may then avoid decompressing one or more other portions that do not comprise the data from the certain rows or columns. In some embodiments, the database server also avoids retrieving disk blocks associated with those portions.

Selective Decompression of Retrieved Compression Unit Portions

In an embodiment, another level of selection may be made after retrieving compression unit portions from disk, in that only certain bytes of a retrieved compression unit or compression unit portions may be selectively decompressed. Selective decompression of retrieved compression unit portions may be based on metadata within the compression unit portion permitting random access to compressed data for various table rows and columns.

Each column in the CU may be read, decompressed, and evaluated independent of the other columns. If a query requires multiple predicates to be evaluated on compressed data, the predicates may be evaluated one at a time. The column containing the data needed to evaluate a first predicate may be found and decompressed in isolation from the other columns in the CU. If the evaluation results indicate that no rows satisfy the first predicate, no other predicates need to be evaluated, and the results may be returned without further decompression. Likewise, as subsequent predicates are evaluated on only the rows that satisfy the previously evaluated predicates, when no rows are left to evaluate, predicate evaluation stops, and decompressing column values referenced by unevaluated predicates is not needed.

In another aspect, once the rows to return are selected by evaluating all predicates, it may be that not all columns of data are selected to be returned. Only those columns that are needed to be returned need to be read and decompressed. Other compressed columns need not even be read, much less decompressed.

Predicate Filtering Optimizations

According to an embodiment, a storage management server may store metadata indicating, for some or all portions of a compression unit, a range of values for some or all of the columns of the table rows stored therein. For each particular column for which a range is specified in metadata associated with a particular compression unit portion, the metadata may be used to determine that no table row in the particular portion of the compression unit comprises a value that is within a particular range. The range may be defined, for example, by minimum and maximum values. In an embodiment, the metadata is stored within the compression unit.

When the storage management server receives a request for data in a compression unit, this metadata may be used to assist in evaluation of any predicates associated with columns for which ranges have been specified. Based on the predicate and the metadata, for example, it may easily be determined whether a particular compression unit stores any rows that match the predicate. If any rows in a portion could possibly match the predicate, the compression unit is decompressed; otherwise, decompression of the compression unit can be avoided.

Such metadata may be useful, for example, where compression unit portions have been divided based upon range partitioning of a certain column, such as a primary key. For example, metadata for a compression unit may specify that a column "ID" of a certain compression unit portion ranges from 100 to 200. If the storage management receives a request that includes a predicate specifying ID=345, the compression unit portion may safely be ignored. However, if the storage management receives a request that includes a predicate ID<150, the compression unit needs to be decompressed.

In an embodiment, metadata may also or instead specify a set of enumerated values possessed by certain columns of table rows in a compression unit portion.

The use of the range data to avoid performing predicate evaluation on groups of rows is a benefit derived from storing only a relatively small number of rows in each CU. The greater the number of rows stored in one CU, the greater the probability that at least one row will have a value that falls within the range, as the range will tend to be wider with a greater number of rows. If only one row has a value that satisfies the predicate, the entire column must be processed.

Exadata Server

An Exadata Server is a storage system that is optimized for use with a database server. Exadata is a combination of software and hardware used to store and access an Exadata-aware database. It provides database aware storage services, such as the ability to offload database processing from the database server to storage, and provides this while being transparent to SQL processing and database applications.

Traditional storage devices are unaware that database files are residing in the managed storage and therefore cannot provide any database-aware I/O or SQL processing. When the database requests rows and columns, what is returned from the storage system are images of data blocks as persistently stored rather than the result set of a database query. Traditional storage has no database intelligence to discern the particular rows and columns actually requested. So when processing I/O on behalf of the database, traditional storage consumes bandwidth, returning much data that is not relevant to the database query that was issued. By returning only the data required to satisfy SQL requests, less data is sent between the database servers and the storage servers. This means that data sent to the database server from the Exadata server may be comprised of rows that are persistently stored in different data blocks or even different compression units, and need not represent a disk image of any data block.

Exadata enables function shipping from the database instance to the underlying storage in addition to providing traditional block serving services to the database Exadata storage is able to return only the rows and columns that satisfy the database query criteria. For example, an Exadata server may be able to evaluate simple predicates that compare a column value to a constant or perform more complex predicates that have more than one constant or that require more than a memory comparison to evaluate, e.g. LIKE predicates and IN-lists. Exadata may contain a subset of the full capabilities of the database management server. This subset may include almost all functions and predicates that do not require any of: highly complex metadata support (such as XML), or advanced processing (such as LOBS and CLOBS), or use system functions that require access to the operating system kernel (such as retrieving information about the user's environment).

Eliminating data transfers and database server workload can greatly benefit data warehousing queries that traditionally become bandwidth and CPU constrained. Eliminating data transfers can also have a significant benefit on online transaction processing (OLTP) systems that often include large batch and report processing operations.

The Exadata software is optimally divided between the database server and Exadata cell. The database server and Exadata Storage Server Software communicate using a protocol that transparently maps database operations to Exadata-enhanced operations. A function shipping architecture is supported in addition to the traditional data block shipping provided by the database. SQL operations may be sent down to the Exadata cells for execution and query result sets returned to the database system. Instead of returning database blocks Exadata cells may return only the rows and columns that satisfy the SQL query. When offload processing is not possible, the Exadata server operates like a traditional storage device for the database server. But when feasible, the intelligence in the database system enables, for example, table scans to be passed down to execute on the Exadata Storage Server so only requested data is returned to the database server.

With Exadata storage, database operations may be handled much more efficiently. Queries that perform table scans can be processed within Exadata with only the required subset of data returned to the database server. Row filtering, column filtering and some join processing (among other functions) may be performed within the Exadata storage cells.

Figure 3:
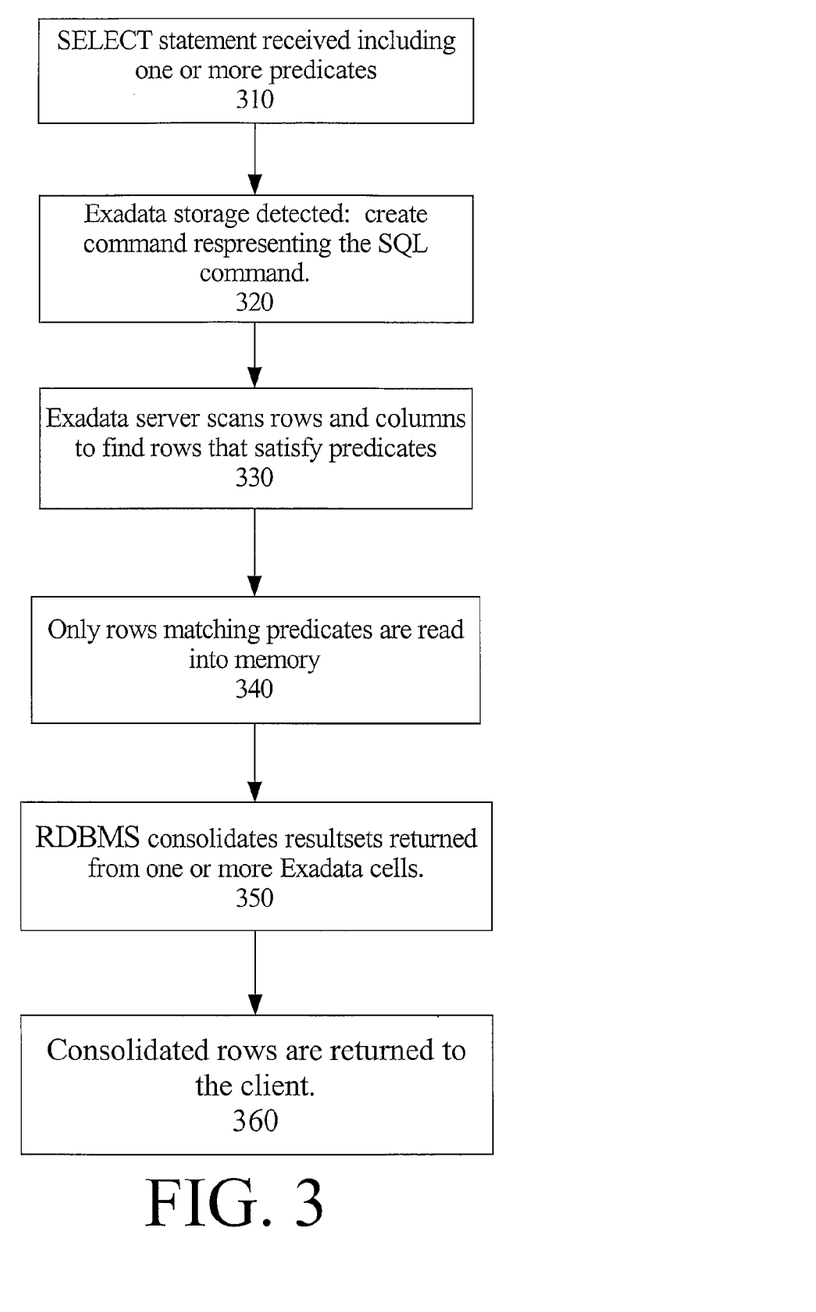
FIG. 3 is a flow diagram showing the steps for offloading query processing to an Exadata server, according to an embodiment of the invention.

FIG. 3 is a flow diagram showing the steps for performing a table scan with Exadata storage. In Step 310, a database application client issues a SELECT statement with one or more predicates that filter and return only rows of interest. In Step 320, the database system determines that Exadata storage is available and constructs a command representing the received SQL command and sends the constructed command to the Exadata storage server. In Step 330, the Exadata software scans the data blocks to identify those rows and columns that satisfy the query. In Step 340, only the rows satisfying the predicate and the requested columns are read into memory. The database system consolidates the result sets from across the Exadata cells in Step 350. In Step 360, the rows are returned to the client.

Exadata provides column filtering, also called column projection, for table scans. Only the columns requested are returned to the database server rather than all columns in a table. For example, when the following SQL is issued, only the employee_name and employee_number columns are returned from Exadata to the database system.

SELECT employee_name, employee_number FROM employee_table;

For tables with many columns, or columns containing LOBs, the I/O bandwidth saved can be very large. When used together, predicate and column filtering may dramatically improve performance and reduce I/O bandwidth consumption. In addition, column filtering also applies to indexes, allowing for even faster query performance.

Returning Large Block Sizes

In previous approaches, the interface between the RDBMS and the storage system returning requested data has been limited to returning a block of data at a time. Another technique to enhance query performance is to allow large buffers of data to pass between the storage system and the RDBMS requesting the data. A memory-only buffer that is larger than a single disk block may be used to pass data back to the RDBMS. This memory-only buffer is placed in the buffer-cache. That is, it is never written to persistent storage. Thus, when returning data from a CU that requires more than one disk block, the data may be returned to the RDBMS in a single transfer rather than transferring data one block at a time.

Vector Processing on Columns

Vector processing is performing an operation on all members of an array in parallel. When a predicate is evaluated on a column, the operation corresponding to the predicate is performed on the values of all rows in the CU in parallel. Thus, vector processing is performed on columns within a CU.

The result of evaluating a predicate on a column may be stored in a vector that stores the results of the operation. In one embodiment, the vector is a bit vector. The vector may be stored with the CU. It is created and initialized to all zero values when the CU is first stored. A temporary bit vector is initialized to have the value of the stored delete bit vector. A predicate is evaluated on column values for rows where the corresponding bit vector value is zero. If a predicate is evaluated and satisfied, the position in the bit vector corresponding to that row continues to have a 0 value. When the predicate is not satisfied, a one is stored in the bit vector at the position corresponding to the row. The bit vector may be returned to the RDBMS as a delete vector. That is, the RDBMS interprets a 1 value in the delete vector as indicating that the corresponding row has been deleted. In another embodiment, the inverse logic may be used.

After a predicate is evaluated and the Boolean values are stored in the bit vector, if there is at least one 0 value in the bit vector, the next predicate may be evaluated. If not, then all rows have been eliminated, and no further predicate evaluation is necessary.

In addition, the bit vector is returned to the RDBMS along with the requested data. A query such as "count *" requires only the number of rows that satisfy the query, and does not require the data in those rows. For such a query, only the bit vector needs to be returned. The RDBMS need only count the number of zero values in the returned bit vector. No row data needs to be transferred back from the storage system to the RDMBS.

Techniques for Returning Data to RDBMS

Generally, data returned from the storage system is decompressed, though it may still be in a compressed format such as Run-Length Encoded (RLE) format or any of the first level compression formats described earlier. RLE format, for example, is a format in which repeated data values across consecutive rows are stored as a count and single instance of the data value. For example, if a column contains a data value "San Jose" for three consecutive rows, rather than storing "San Jose" three times, the RLE representation may be stored as "3 San Jose." Keeping data in RLE format reduces the amount of data that needs to be transferred between the storage system and the RDBMS. It also increases the probability that the data to be returned will fit into the return buffer.

Although the buffer size for passing data back from the storage system to the RDBMS may be larger than a disk block, there is still an upper limit on the size of the return buffer. However, if the data to be returned does not fit into the return buffer, it might be necessary to send the data back in compressed format. When the data is sent in compressed format, an entire CU may be returned as stored on disk, including rows that did not satisfy the set of predicates. The bit vector that is returned as the delete vector indicates to the RDBMS, which rows within the compression unit satisfy the query.

Alternatively, if the size of the uncompressed data from the rows stored in CU that satisfy the query fit into the output buffer, then only the rows that satisfy the query are returned. Thus, data must be copied from the CU into the output buffer as though only those rows that satisfied the query resided on disk within the block. There are several techniques for enhancing performance regarding the copying of data from the CU into the result set within the RDBMS.

Using Bit Vector for Large Memory Copy

One approach for copying uncompressed data from the compression unit to the return buffer is to inspect the bit vector and for each position in the bit vector where there is a zero value, copy the corresponding row of the compression unit into the return buffer. However, that requires copying one row at a time. Another approach used in an embodiment of the invention described herein is to determine the number of consecutive zero values in the bit vector and to copy the corresponding number of rows in one operation. Thus, if there were three consecutive zero values in the bit vector, the three consecutive rows they represent could be copied starting at the beginning of the first of the three rows and all the bytes in the three rows copied in a single memory copy operation.

Processing Run Length Encoded Data

Even when data is returned to the RDBMS in uncompressed format, the data still may be run-length encoded. If a column value is repeated across consecutive rows, the value only appears once with the number of rows for which the value is repeated. Although this encoding is beneficial for saving storage space and copying time, having RLE data presents a challenge when some, but not all, of the consecutive rows that share a value do not also satisfy all of the required predicates. In one embodiment, the run-length encoding is modified to reduce the number of rows in the RLE to reflect only those rows that are returned as a query result. For example, suppose rows 34, 35, and 36 have the value "San Jose" for a column representing a city name, but the query is for rows representing San Jose, Calif. and row 35 represents San Jose, Costa Rica. The RLE for rows 34-36 might be logically (3, "San Jose") and the bit vector for the return buffer for these rows might be (0, 1, 0). The number of zero values in the bit vector for the corresponding rows that are grouped together for RLE becomes the new RLE value: (2, "San Jose").

Stitching Rows Together

The benefits derived from using a small compression unit representing a small number of rows that are stored in column-major format is achieved at the cost of converting the data between row-major format used by the RDBMS and column-major format used by the storage system for storing each compression unit. To achieve the above-described benefits, it is necessary to perform this conversion efficiently. In one embodiment, a small matrix is used to perform the conversion, iteratively converting only the amount of data from the return buffer that fits within the matrix at one time. The size of the matrix is chosen so that the entire matrix fits comfortably within the database server processor cache. In an embodiment, the matrix is sized to be one-third of the cache size. Whereas the return buffer contains the materialized data requested in the query, the matrix holds pointers to the data within the return buffer. The pointers together with the length of the data each points to within the return buffer are placed in the matrix in column-major order. When the matrix is full, the pointers are copied out of the matrix into a result set buffer in row order.

The matrix size is static based on the size of the processor cache. Thus, the number of rows that can be stored in the matrix at one time depends on the number of columns represented in the return buffer. The number of rows is inversely proportional to the number of columns. For example, if the total size of the matrix is 100 Kb and 10 columns are returned from the query, then 10 rows can be converted at once through the matrix. If the next query result contained 4 columns of data values, then 25 rows could be processed at once. The return buffer is iteratively processed until all rows have passed through this conversion process. This conversion process is called row stitching.

In addition to stitching together rows processed through different iterations of conversion through a cache-size friendly matrix, the return buffers representing the query results for each of the CU's are copied into the query result set. The database server need not be aware of the boundaries between CU's.

Figure 4:
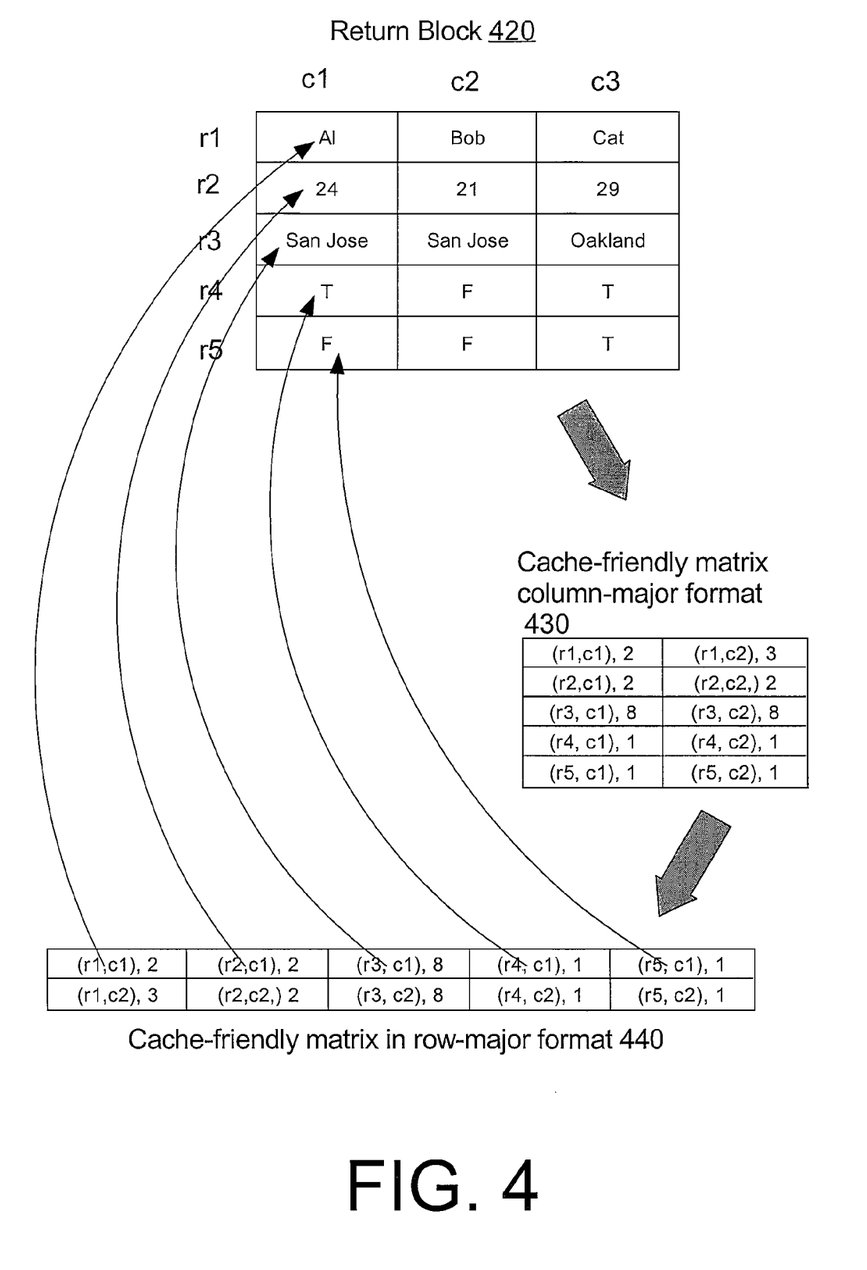
FIG. 4 is a diagram that provides an example of row stitching, according to an embodiment of the invention.

FIG. 4 shows an example of this conversion process. The Return Block 420 stores the uncompressed, materialized data from a single CU that was requested by the RDBMS. The data in the Return Block 420 is stored in column-major format. Matrix 430 is a buffer whose size is chosen so that it fits entirely within the processor cache. All operations performed on the matrix are performed on data in the cache. Each cell in the matrix contains a pointer to a value in Return Block 420 and a length of the value pointed to. The naming convention used in the figure to identify a pointer is (row #, column #), though any representation for a pointer may be used.

In the example shown in FIG. 4, the matrix size is 10. The Return Block 420 size is 15, so not all of the data in Return Block 420 will fit in the matrix at once, and thus, it will take more than one iteration to process all the data in the buffer. Because the return data comprises five columns for each of 3 rows, only two rows may be returned at a time. Once these two rows are converted to row-major format and returned, the remaining row may be converted and returned.

In the example, (r1, c1) represents the data value stored in row 1 and column 1 of the Return Block 420. (r1, c1) points to the value "A1" in the example, and the length is 2 because "A1" takes 2 bytes. The length may be expressed in terms of any units. Similarly, (r4, c2) is a pointer to "San Jose" which has a length of 8 bytes. The matrix cell values are copied into the matrix in column-major format for only the number of rows being converted in a single pass; for example, pointers to data values would be placed to data values in the following order: A1, Bob, 24, 21, San Jose, San Jose, T, F, F, F. Once the matrix is populated, the values may be read out of the matrix into buffer 440 in row-major format. Once complete, the data in buffer 440 is returned and stitched into the query result set.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
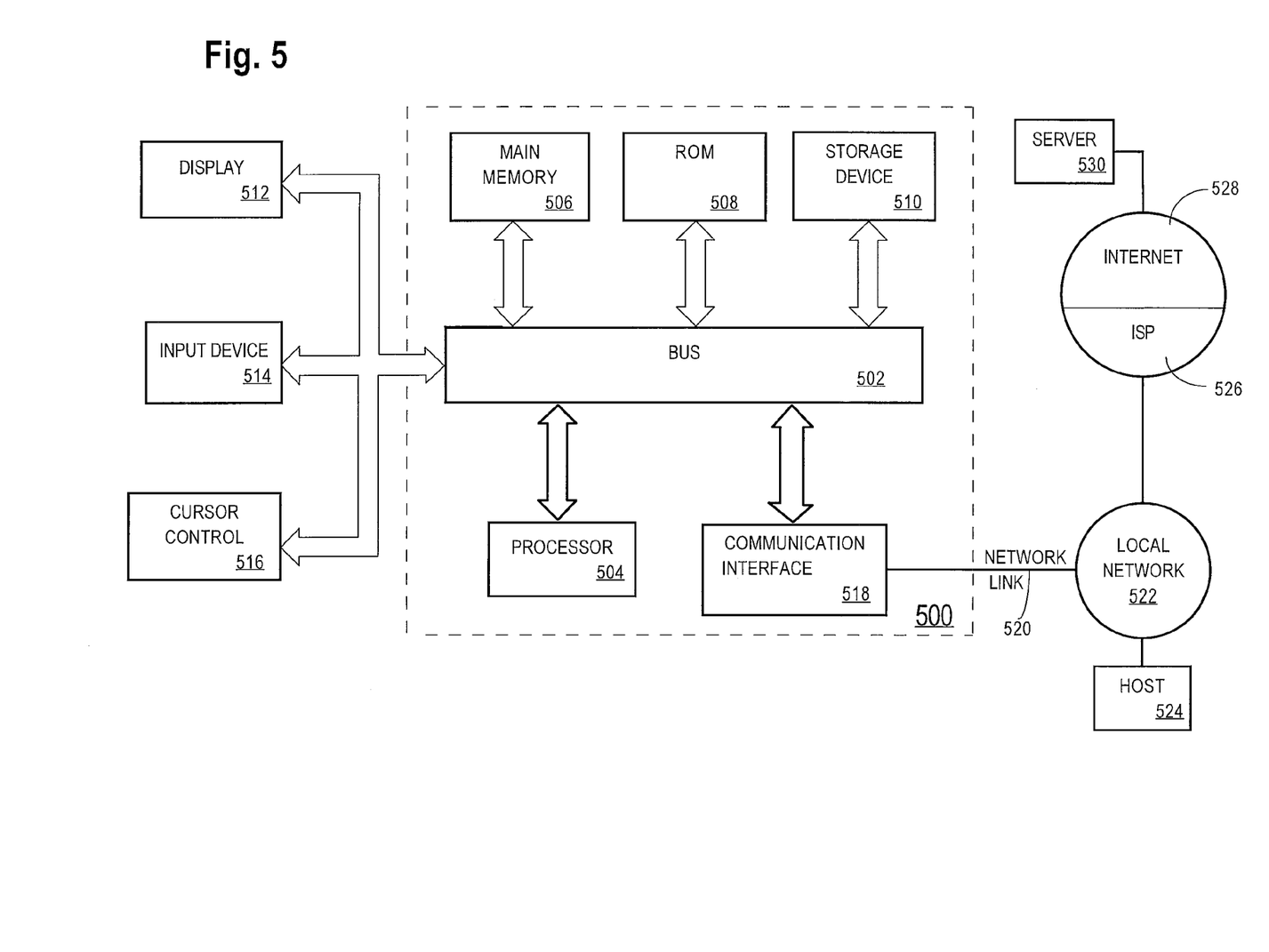
FIG. 5 is a block diagram that illustrates a computer system upon which an embodiment in accordance with the present invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    a storage system comprising a processor and memory storing rows of database tables in a plurality of data blocks in non-volatile storage, each data block of said plurality of data blocks storing one or more columns of one or more rows of a database table of said database tables, said database tables being managed by a database management system ("DBMS") configured to return data from said database tables in response to database queries issued to the DBMS by clients of the DBMS;
    wherein said storage system is configured to return, in entirety, requested data blocks to said DBMS in response to a request made via a network by the DBMS, wherein the request identifies the requested data blocks;
    said storage system receiving a particular request via said network for particular data blocks filtered according to particular one or more column criteria, said particular request identifying said particular data blocks and said particular one or more column criteria; and
    in response to said storage system receiving said particular request for the particular data blocks:
        said storage system scanning said particular data blocks for particular rows having column values that satisfy said particular one or more column criteria;
        said storage system storing in a return buffer the particular rows having column values that satisfy said particular one or more column criteria; and
        said storage system returning the particular rows stored in said return buffer to said DBMS;
    wherein scanning said particular data blocks for particular rows having column values that satisfy said particular one or more column criteria includes, for a particular subset of said particular data blocks:
    retrieving data values only for a first column identified in a first criterion of said particular one or more column criteria;
    evaluating the first criterion based on data values in the first column;
    storing, at a position within a first vector, a criteria satisfaction value corresponding to a row of the particular rows that indicates that a data value in the first column of the row that satisfies the first criterion;
    determining to evaluate a second criterion;
    storing, at a position within a second vector, a second criterion satisfaction value corresponding to a row of the particular rows that indicates that a data value in a second column of the row that satisfies the second criterion;
    wherein the second criterion identifies the second column;
    performing an operation on the first vector and the second vector and storing results of the operation in a cumulative vector.

2. The method of claim 1, wherein:
    said particular one or more column criteria is based on a set of one or more predicates from a particular query from a particular client to the DBMS;
    each predicate of the one or more predicates identifies a column of the database table.

3. The method of claim 1, wherein only rows having a corresponding criteria satisfaction value stored in the first vector are stored in the return buffer.

4. The method of claim 3, wherein only rows having a corresponding criteria satisfaction value stored in the cumulative vector are stored in the return buffer.

5. The method of claim 1, further comprising compressing the particular rows in the return buffer within one or more compression units.

6. The method of claim 5, wherein returning the particular rows stored in the said return buffer to the DBMS comprises returning said one or more compression units.

7. The method of claim 1, wherein:
    columns in said particular data blocks are compressed independently;
    a first criterion of the particular one or more column criteria only requires data values from a first column to be satisfied; and
    scanning said particular data blocks for particular rows having column values that satisfy said particular one or more column criteria comprises:
        evaluating said first criterion that identifies said first column by at least performing a first decompression on said first column and evaluating said first criterion based on data values in said first column;
        after evaluating said second criterion, performing a second decompression on said second column and evaluating said second criterion based on data values in said second column.

8. The method of claim 1, wherein:
    each data block of said particular data blocks is associated with metadata based on column values in the data block; and
    scanning said particular data blocks comprises determining whether said particular rows have column values that satisfy said particular one or more column criteria based on said metadata associated with each data block of said particular data blocks.

9. A non-transitory computer-readable storage medium storing instructions which when executed by one or more processors cause:
    a storage system comprising a processor and memory storing rows of database tables in a plurality of data blocks in non-volatile storage, each data block of said plurality of data blocks storing one or more columns of one or more rows of a database table of said database tables, said database tables being managed by a database management system ("DBMS") configured to return data from said database tables in response to database queries issued to the DBMS by clients of the DBMS;

wherein said storage system is configured to return, in entirety, requested data blocks to said DBMS in response to a request made via a network by the DBMS, wherein the request identifies the requested data blocks;

said storage system receiving a particular request via said network for particular data blocks filtered according to particular one or more column criteria, said particular request identifying said particular data blocks and said particular one or more column criteria; and in response to said storage system receiving said particular request for the particular data blocks:
said storage system scanning said particular data blocks for particular rows having column values that satisfy said particular one or more column criteria;
said storage system storing in a return buffer the particular rows having column values that satisfy said particular one or more column criteria; and
said storage system returning the particular rows stored in said return buffer to said DBMS;

wherein scanning said particular data blocks for particular rows having column values that satisfy said particular one or more column criteria includes, for a particular subset of said particular data blocks:

retrieving data values only for a first column identified in a first criterion of said particular one or more column criteria;

evaluating the first criterion based on data values in the first column;

storing, at a position within a first vector, a criteria satisfaction value corresponding to a row of the particular rows that indicates that a data value in the first column of the row that satisfies the first criterion;

determining to evaluate a second criterion;

storing, at a position within a second vector, a second criterion satisfaction value corresponding to a row of the particular rows that indicates that a data value in a second column of the row that satisfies the second criterion;

wherein the second criterion identifies the second column;

performing an operation on the first vector and the second vector and storing results of the operation in a cumulative vector.

10. The non-transitory computer-readable storage medium of claim 9, wherein:
said particular one or more column criteria is based on a set of one or more predicates from a particular query from a particular client to the DBMS;
each predicate of the one or more predicates identifies a column of the database table.

11. The non-transitory computer-readable storage medium of claim 9, wherein only rows having a corresponding criteria satisfaction value stored in the first vector are stored in the return buffer.

12. The non-transitory computer-readable storage medium of claim 9, wherein only rows having a corresponding criteria satisfaction value stored in the cumulative vector are stored in the return buffer.

13. The non-transitory computer-readable storage medium of claim 9, wherein the instructions, when executed by the one or more processors, further cause compressing the particular rows in the return buffer within one or more compression units.

14. The non-transitory computer-readable storage medium of claim 13, wherein returning the particular rows stored in the said return buffer to the DBMS comprises returning said one or more compression units.

15. The non-transitory computer-readable storage medium of claim 9, wherein:
columns in said particular data blocks are compressed independently;
a first criterion of the particular one or more column criteria only requires data values from a first column to be satisfied; and
scanning said particular data blocks for particular rows having column values that satisfy said particular one or more column criteria comprises:
evaluating said first criterion that identifies said first column by performing a first decompression on only said first column, and evaluating said first criterion based on data values in said first column.

16. The non-transitory computer-readable storage medium of claim 9, wherein:
each data block of said particular data blocks is associated with metadata based on column values in the data block; and
scanning said particular data blocks comprises determining whether said particular rows have column values that satisfy said particular one or more column criteria based on said metadata associated with each data block of said particular data blocks.

17. The method of claim 1, wherein the particular rows comprise a first row from a first data block in said plurality of data blocks and a second row for a different second data block in said plurality of data blocks.

18. The non-transitory computer-readable storage medium of claim 9, wherein the particular rows comprise a first row from a first data block in said plurality of data blocks and a second row for a different second data block in said plurality of data blocks.

19. The method of claim 1, wherein a particular compression unit comprises compressed data from a plurality of data blocks.

20. The method of claim 19:
wherein said particular compression unit comprises a plurality of compression unit portions, a first compression unit portion comprising data from a first data block and a second compression unit portion comprising data from a second data block;
wherein the storage system scanning said particular data blocks for particular rows having column values that satisfy said particular one or more column criteria comprises determining that the first compression unit portion comprises one or more of the particular rows, but the second compression unit portion does not comprise one or more of the particular rows;
wherein said storage system storing the particular rows in the return buffer comprises decompressing the first compression unit portion and returning the one or more of the particular rows from the decompressed first compression unit portion.

21. The method of claim 19, further comprising:
storing compression unit metadata identifying locations at which compressed data for certain columns or rows is held in the compression units;
wherein said storage system storing the particular rows in the return buffer comprises using the compression unit metadata, determining locations in the compression units of the particular rows and decompressing only the rows in the determined locations.

22. The method of claim 19, further comprising:
storing compression unit metadata identifying, for the particular compression unit, a range of values for one or more columns in the particular compression unit;

wherein scanning said particular data blocks for the particular rows comprises determining whether the range of values in the compression unit metadata comprises the column values that satisfy said particular one or more column criteria;

decompressing the particular compression unit for further scanning in response to determining that the range of values in the compression unit metadata comprises the column values that satisfy said particular one or more column criteria.

23. The method of claim 1, further comprising:

determining, whether the criteria satisfaction value corresponding to any row is stored in the first vector;

in response to determining that at least one criteria satisfaction value corresponding to any row is stored in the first vector, determining to evaluate the second criterion.

24. The method of claim 1, said storage system storing in a return buffer the particular rows having column values that satisfy said particular one or more column criteria comprises said storage system storing in the return buffer only columns of the particular rows that satisfy the one or more column criteria.

* * * * *

UNITED STATES PATENT AND TRADEMARK OFFICE
CERTIFICATE OF CORRECTION

PATENT NO.         : 10,025,820 B2
APPLICATION NO.    : 14/480009
DATED              : July 17, 2018
INVENTOR(S)        : Marwah et al.

Page 1 of 1

It is certified that error appears in the above-identified patent and that said Letters Patent is hereby corrected as shown below:

On the Title Page

In the illustrative figure, Ref. Numeral 320, Line 2, delete "respresenting" should read
-- representing --.

In the illustrative figure, Ref. Numeral 350, Line 1, delete "resultsets" should read -- result sets --.

In the Drawings

On sheet 3 of 5, in FIG. 3, under Reference Numeral 320, Line 2, delete "respresenting" and insert
-- representing --, therefor.

On sheet 3 of 5, in FIG. 3, under Reference Numeral 350, Line 1, delete "resultsets" and insert
-- result sets --, therefor.

In the Specification

In Column 10, Line 42, delete "RDMBS." and insert -- RDBMS. --, therefor.

Signed and Sealed this
Ninth Day of April, 2019

Andrei Iancu
*Director of the United States Patent and Trademark Office*